(12) United States Patent
Hoban et al.

(10) Patent No.: US 7,133,830 B1
(45) Date of Patent: Nov. 7, 2006

(54) SYSTEM AND METHOD FOR SUPPORTING PLATFORM INDEPENDENT SPEECH APPLICATIONS

(75) Inventors: Thomas X. Hoban, Chicago, IL (US); David F. Craigmile, Jr., Chicago, IL (US); Robert A. Dickel, Oak Park, IL (US); Paul E. Grafing, Chicago, IL (US); Garrett M. Smith, Chicago, IL (US); Troy D. Smith, Chicago, IL (US); Cynthia L. Tarpo, Chicago, IL (US)

(73) Assignee: SR2, Inc., Chicago, IL (US)

( * ) Notice: Subject to any disclaimer, the term of this patent is extended or adjusted under 35 U.S.C. 154(b) by 420 days.

(21) Appl. No.: 10/007,907

(22) Filed: Nov. 13, 2001

(51) Int. Cl.
G10L 11/00 (2006.01)
H04M 1/64 (2006.01)
H04M 11/00 (2006.01)

(52) U.S. Cl. ............... 704/270.1; 379/88.17; 379/88.18

(58) Field of Classification Search ............. 704/270.1; 379/88.18
See application file for complete search history.

(56) References Cited

U.S. PATENT DOCUMENTS

| 6,035,275 | A | 3/2000 | Brode et al. |
| 6,141,724 | A | 10/2000 | Butler et al. |
| 6,421,427 | B1 * | 7/2002 | Hill et al. ............... 379/88.14 |
| 6,636,831 | B1 * | 10/2003 | Profit et al. ................. 704/275 |
| 6,711,249 | B1 * | 3/2004 | Weissman et al. ..... 379/221.06 |
| 6,741,853 | B1 * | 5/2004 | Jiang et al. ................. 455/418 |
| 7,024,348 | B1 * | 4/2006 | Scholz et al. ................. 703/24 |
| 2001/0013001 | A1 | 8/2001 | Brown et al. |
| 2002/0107891 | A1 * | 8/2002 | Leamon et al. ............. 707/513 |
| 2003/0007609 | A1 * | 1/2003 | Yuen et al. ............... 379/88.16 |
| 2003/0083882 | A1 * | 5/2003 | Schemers, III et al. .. 704/270.1 |
| 2003/0088421 | A1 * | 5/2003 | Maes et al. ............. 704/270.1 |

FOREIGN PATENT DOCUMENTS

| WO | WO 00/20962 | 4/2000 |
| WO | WO 00/65474 | 11/2000 |
| WO | WO 00/65814 | 11/2000 |

(Continued)

OTHER PUBLICATIONS

SALT Forum, "Cisco, Comverse, Intel, Microsoft, Philips and SpeechWorks Found Speech Application Language Tags Forumn to Develop New Standard For Multimodal and Telephony-Enabled Applications and Services", Press Release, Oct. 15, 2001.*

(Continued)

Primary Examiner—David Hudspeth
Assistant Examiner—Brian L. Albertalli
(74) Attorney, Agent, or Firm—James L. Katz; Brinks Hofer Gilson & Lione

(57) ABSTRACT

A system and method for providing end user speech applications. The system is embodied in an application environment framework which exchanges messages with a target execution platform having a local call flow interpreter. A speech application comprised of a plurality of generic call flow objects is executed on the application environment framework. While the speech application executes, the application environment framework translates the generic call flow objects into platform specific call flow objects having a format recognizable by the local call flow interpreter of the target execution platform, formats the platform specific call flow objects into reply messages using a protocol recognizable by the target execution platform, and transmits the messages to the target execution platform. In this manner, a platform independent speech application effectively controls the operation of a platform dependent call flow interpreter to provide voice interaction with an end user.

29 Claims, 3 Drawing Sheets

FOREIGN PATENT DOCUMENTS

WO    WO 02/091364 A1 *    5/2001

OTHER PUBLICATIONS

Gold Systems, Inc., "Vonetix Voice-To-Net," (2001).

Ellen Muraskin, "The Portal Pushers: Speech Vendors Posed to Grow The Voice Web," IBM, (Dec. 5, 2000).

"Products: Voice XML & Standards,"—How to Get SpeechWorks' Open-Source Software, SpeechWorks.

Products: Voice XML & Standards,—Speech Links, SpeechWorks.

V-Commerce Alliance Delivers an Open and Standard Platform for Building Speech Recognition Applications, Java Industry Connection, java.sun.com (Jun. 21, 1999).

Accelerating Next-Generation Service Delivery, SandCherry Networks, Boulder, Colorado (2001).

* cited by examiner

SYSTEM AND METHOD FOR SUPPORTING PLATFORM INDEPENDENT SPEECH APPLICATIONS

BACKGROUND OF THE INVENTION

This invention relates generally to interactive voice response networks and, more particularly, relates to a system and method for supporting platform independent speech applications.

As described in published PCT patent application WO 00/65814, interactive voice response ("IVR") systems are rapidly becoming ubiquitous in everyday life. In this regard, IVR systems are commonly used to automate certain tasks that otherwise would be performed by a human being. More specifically, IVR systems are systems which create a dialog between a human caller and/or speaker and a computer system to perform tasks on behalf of the speaker.

As further described in WO 00/65814, current IVR systems are typically implemented by programming computer hardware with special-purpose software. In a speech-enabled IVR system, the software includes telephony services, a speech recognition engine, text-to-speech (TTS) services, audio and DTMF handling, audio recording services, and a speech enabled application. For defining a dialog interaction between a speaker and a speech recognition mechanism, WO 00/65814 describes the use of speech objects. Each speech object is used to acquire a particular type of information from the speaker during an interaction between the speaker and the speech recognition mechanism. More particularly, a speech object is an instantiation of a user-extensible class that includes properties, such as prompts and grammars, associated with the corresponding type of interaction. A speech object also includes logic for controlling the interaction with the speaker when executed in a processing system.

Disadvantageously, the speech objects disclosed in WO 00/65814 are "fat client" objects that are required to be executed on a native IVR server, or remotely, but under the control of a native IVR application call flow, i.e., speech object applications, in combination with the native IVR call flows that control them, are platform dependent. Since a speech object application requires the use of the call flow interpreter, scripting language, and speech recognition resources that reside on, and/or are tightly coupled to, the native IVR platform and/or speech recognition vendor, speech object applications are not readily portable to the IVR platforms of other vendors. Thus, a complete speech object application is required to be coded specifically for use in connection with one and only one native IVR platform. Furthermore, speech objects suffer the disadvantage of failing to have the capability to emit call flow directives such as VXML.

A further example of an IVR environment is seen in the "Vonetix" system marketed by Gold Systems, Inc. In this regard, like the systems disclosed in WO 00/65814, the native IVR platform call flow scripting language is still required in order to build the application and drive the call flow. Accordingly, the "Vonetix" system suffers from the same disadvantages previously noted with respect to the environments disclosed in WO 00/65814.

From the foregoing, it will be appreciated that developing IVR speech applications presently requires an unusual and complex combination of infrastructure investments and application development expertise. Users currently desiring IVR speech applications are disadvantageously required to develop applications which can be executed only on a specific, special-purpose IVR platforms which IVR platform can cost more than $50,000 per server. The expense associated with developing IVR speech applications coupled with the high cost of the underlying special-purpose IVR hardware platforms prevent many users, such as small business owners, from updating their IVR applications and/or changing the underlying IVR platform which is used to support interactive voice customer care and support. Accordingly, a need exists for a platform independent application environment which can be used to provide portable IVR applications, not simply portable speech recognition or TTS services.

SUMMARY OF THE INVENTION

In accordance with this need, a system and method for providing speech applications with an end user is provided. The system is embodied in an application environment framework which exchanges messages with a target execution platform having a local call flow interpreter. A speech application comprised of a plurality of generic call flow objects is executed on the application environment framework. While the speech application executes, the application environment framework translates the generic call flow objects into platform specific call flow objects having a format recognizable by the local call flow interpreter of the target execution platform, formats the platform specific call flow objects into reply messages using a protocol recognizable by the target execution platform, and transmits the messages to the target execution platform. In this manner, a platform independent speech application effectively controls the operation of a platform dependent call flow interpreter to provide voice interaction with an end user.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to preferred embodiments shown in the attached drawings in which.

DETAILED DESCRIPTION

Figure 1:
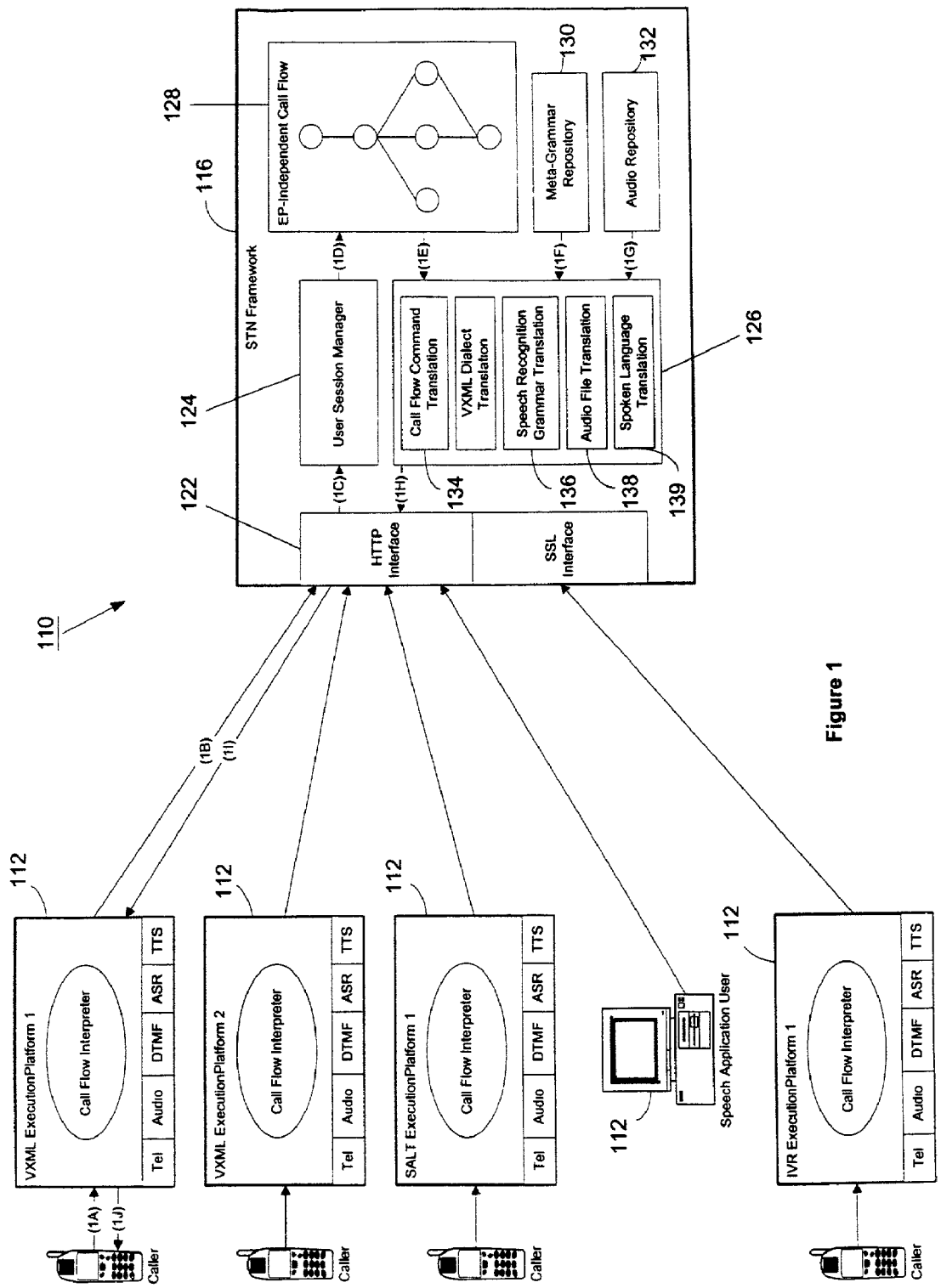
FIG. 1 illustrates an exemplary IVR network in which the principles of the subject invention may be employed.

Turning now to the figures, wherein like reference numerals refer to like elements and a prefix representative of the Figure in which an element first appears is used, there is illustrated in FIG. 1 an exemplary IVR network 110 for use in providing speech applications related to customer care and commerce. An application environment 116 is provided that comprises a modular framework of objects that allows complete IVR applications to be developed, deployed, and hosted independent of, and be portable across, different execution platforms 112. This allows companies to build IVR applications with more flexible deployment options which, in turn, allows companies to protect their investment from vendor specific technology limitations. For example, a single IVR application could be developed that can be deployed so as to control the simultaneous operation of multiple, different execution platforms without the need to recompile or change the code. Furthermore, the framework of the subject application environment allows IVR applications to be seamlessly integrated with legacy execution platforms 112 while also allowing the application environment to be extensible to new execution platforms 112.

Within the IVR network 110, the execution platforms 112 and the application environment framework 116 can be implemented on one or more general purpose computing devices which operate under the control of computer executable instructions. Those of skill in the art will appreciate that the general purpose computing devices need not be limited to computers and servers but may include hand-held devices, multiprocessor systems, microprocessor-based or programmable consumer electronics, minicomputers, mainframe computers, and the like. Furthermore, the computer executable instructions may include routines, programs, objects, components, and/or data structures that perform particular tasks. Within the network, the computer executable instructions may reside on a single general purpose computing device or the tasks performed by the computer executable instructions may be distributed among a plurality of the general purpose computing devices.

For performing the tasks in accordance with the computer executable instructions, the general purpose computing devices preferably include one or more of a video adapter, a processing unit, a system memory, and a system bus that couples the video adapter and the system memory to the processing unit. The video adapter allows the computing devices to support a display, such as a cathode ray tube ("CRT"), a liquid crystal display ("LCD"), a flat screen monitor, a touch screen monitor or similar means for displaying textual and graphical data to a user. The display allows a user to access, view, enter, and/or edit information that is relevant to the operation of the IVR network 110.

The system memory in the general purpose computing devices may include read only memory ("ROM") and/or random access memory ("RAM"). The general purpose computing devices may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices.

To connect the general purpose computing devices within the IVR network 110, the general purpose computing devices may include a network interface or adapter. When used in a wide area network, such as the Internet, the general purpose computing devices typically include a modem or similar device which functions in the same manner as the network interface. The modem, which may be internal or external, may be connected to the system bus via an external port interface. It will be appreciated that the described network connections are exemplary and that other means of establishing a communications link between the general computing devices may be used. For example, a wireless access interface that receives and processes information from the general purpose computing devices via a wireless communications medium, such as, cellular communication technology, satellite communication technology, blue tooth technology, WAP technology, or similar means of wireless communication can be utilized.

To provide network security, the IVR network 110 may also utilize security techniques that have become customary when conducting electronic business. These security techniques include, but are not limited to, firewalls, encryption, authentication certificates, directory-based user registration and security management, etc. Because the capabilities and best practices of network communication security are constantly evolving and improving, this document does not espouse the use of any particular technique, technology or product. Rather, it simply specifies that the network architecture should support the use of security practices necessary to protect the business interests of the participants and to insure the overall integrity and confidentiality of information within the system.

For exchanging information between the partners within the IVR network 110 any networking protocol can be utilized. For example, it is contemplated that communications can be performed using TCP/IP. Generally, HTTP and HTTPS are utilized on top of TCP/IP as the message transport envelope. Additional protocol technologies such as FTP, SSL, etc. may also be utilized. Furthermore, depending on the differing business and technical requirements of the various partners within the system, the physical network may embrace and utilize multiple communication protocol technologies.

Access to the IVR network 110 is provided by the execution platforms 112. In this regard, the execution platforms 112 can be implemented as an IVR execution platform, client computer hosting a speech application, or the like. The execution platform 112 generally supports at least a means for establishing a voice connection with the IVR network, a speech application call flow interpreter, and appropriate hardware and software for allowing audio data to be communicated to and from the speaker through an audio interface. The means for establishing a voice connection with the IVR network can include well-known technologies such as telephony transport infrastructures (which are found in presently available IVR execution platforms), Internet telephony applications, general speech applications, or the like. Speech application call flow interpreters are also well-known in the art and are similarly included in presently available IVR execution platforms.

Figure 2:
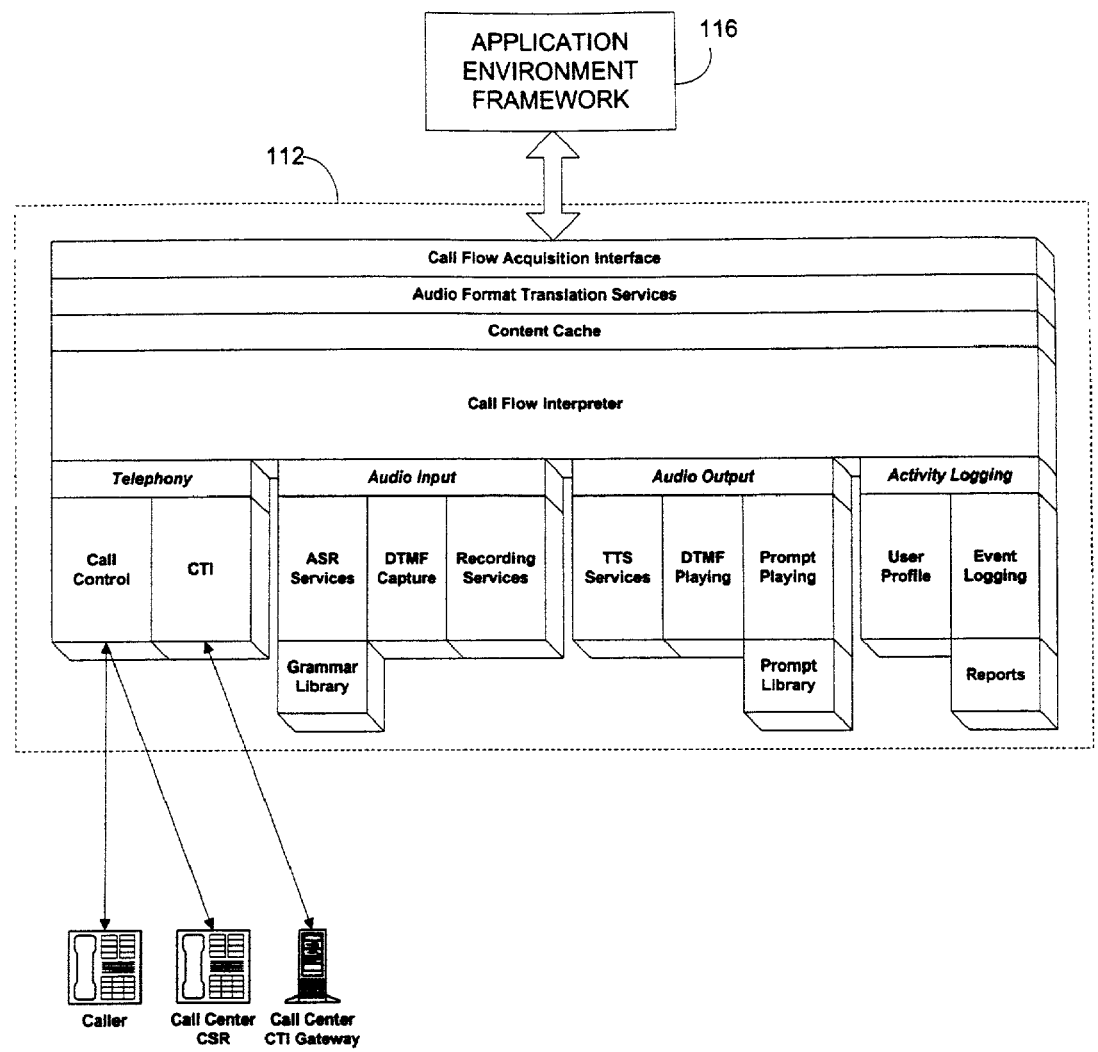
FIG. 2 illustrates the modules associated with an exemplary IVR execution platform.

By way of example only, FIG. 2 illustrates services that may be found in an execution platform 112, in particular, an exemplary "Tellme" VXML browser execution platform. Example of other known execution platforms 112 that may be utilized in the described IVR network 110 include, but are not limited to, execution platforms manufactured by Nuance, IBM, Avaya, Telera, Net2Phone, Edify, and Syntellect. Generally, these known IVR servers also include modules such as those illustrated in FIG. 2 that allow the execution platform 112 to perform one or more of the following services to a running speech application: access to customers through a telephony transport infrastructure; telephony server control of the call pick-up, hang-up, transfer, etc.; call flow execution (i.e., using VXML, call flow scripting languages, etc.); speech and DTMF recognition; text-to-speech, playing of prompts and DTMF; recording user speech; CTI integration; and data and transaction access.

To provide execution platform 112 independence for the speech application, the application environment framework 116 generally comprises a layered, modular framework as illustrated in FIG. 1. In this regard, the application environment 116 includes a communications server layer 122 having communications modules that allow the general purpose computer hosting the application environment framework 116 to exchange messages with varied execution platforms 112. By way of example, the communications server layer 122 can have communications modules that support one or more of HTTP, SSL, etc. protocol communications. Additional modules/layers included within the framework of the application environment 116 include a session manager 124, an execution platform translation services layer 126, a generic call flow interpreter module 128, a meta-grammar repository 130, and an audio repository 132. While not required, the various modules/layers are preferably implemented so as to execute on a Java Virtual Machine thereby allowing the application environment framework 116 to be hosted on different types of general purpose computing devices. The functions of the various modules/layers will become apparent from the description that follows which generally describes the operation of the IVR network 110.

To provide voice interaction with an end user, a speech application comprising a plurality of inter-connected call flow objects is first created. As will be understood by those of skill in the art, the call flow objects can provide audio playing, speech and DTMF recognition, recording, business logic processing, data access, call transfer, and hang-up functions. Unlike commonly known call flow objects, such as described in published PCT patent application WO 00/65474, the present call flow objects are indifferent to the execution platform 112 which they will ultimately control and constitute the entire call flow and navigation structure, without any reference or dependency on the one or more execution platforms that will be driven by them.

In response to an end-user access of the IVR network 110 (illustrated as step 1A in FIG. 1), the execution platform 112 issues a request (1B) to the application environment framework 116 to initiate an interactive voice response session. As will be appreciated by those of skill in the art, access to the IVR network 110 may be accomplished by the end-user dialing a phone number, accessing a Web site, etc. which places the end-user in voice communication with the execution platform 112. When the application environment framework 116 is located remotely from the execution platform 112, the request from the execution platform 112 may be issued to a specific IP/network address or the like which is known by the execution platform 112 to be associated with the execution environment framework 116. Further, the request can be issued using the HTTP protocol, SSL protocol, or the like. In the case of an HTTP protocol request, the request can take the form of an HTTP POST or GET request. This is particularly the case when the execution platform 112 is an IVR execution engine hosting a VXML browser.

Upon receipt of the request from the execution platform 112, the Web server layer 122 invokes (1C) the session manager 124 which launches (1D) the speech application as an execution thread. It will be appreciated that the launched thread is for a specific user session and, as such, each user is assigned their own specific thread of execution. Upon being launched, the first state of the executing speech application is retrieved from the generic call flow interpreter module 128 and provided (1E) to the execution platform translation service layer 126. The execution platform translation service layer 126 generally functions to translate the call flow object associated with the present state to a form recognizable and executable by the call flow interpreter of the execution platform 112 that initiated the request. In this regard, the application environment framework 116 may be made aware of the call flow object format to which the call flow object is to be translated into by having the target execution platform 112 identify itself (and its native call flow interpreter) to the application environment framework 116 when the target execution platform 112 transmits its initial request to the application environment framework 116. Information indicative of the type of speech application/call flow interpreter supported by the execution platform 112 could be included in a data field in the initial HTTP request message or by other well known means.

Figure 3:
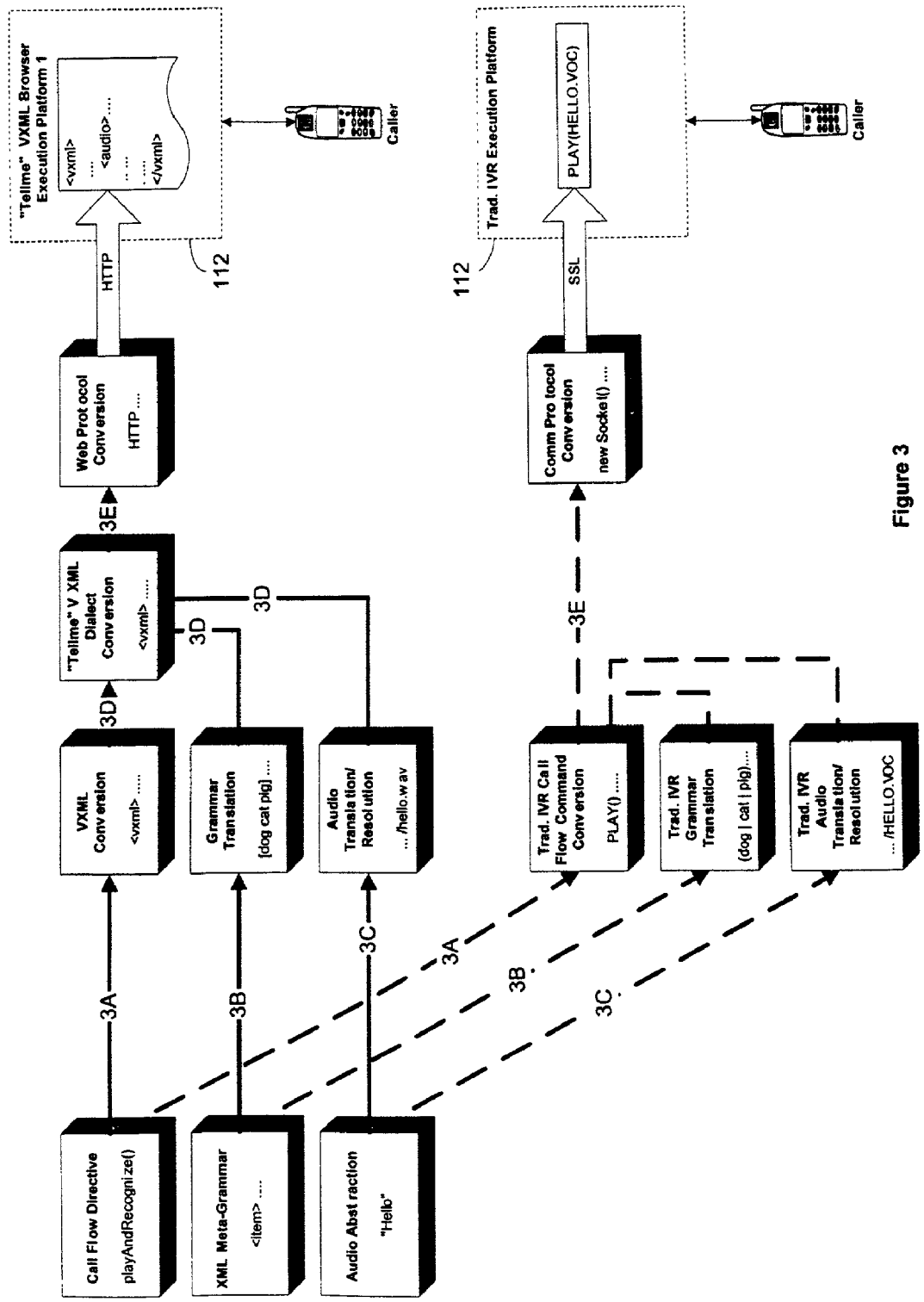
FIG. 3 illustrates exemplary steps used to translate call flow objects in accordance with the principles of the subject invention.

To translate the generic call flow object into a format that is recognizable by an execution platform specific call flow interpreter/speech application, the execution platform translation services layer 126 may include a call flow command translation module 134, a call flow speech recognition grammar translation module 136, a call flow audio translation module 138, and a spoken language translation module 139. Generally, as illustrated in FIG. 3, the call flow command translation module 134 functions to convert (illustrated as step 3A in FIG. 3) a generic directive call flow object into a platform specific directive call flow object, i.e., a directive recognizable by the call flow interpreter/speech application of the target execution platform 112. Examples of call flow directives, which generally function as a generic API to access specific platform call flow interpreters, speech recognition and text-to-speech services, telephony cards, port management, etc., are set forth in Exhibit A. It is to be understood that the call flow directives set forth in Exhibit A are not intended to be limiting and that changes to these call flow directives, additional call flow directives, etc. are contemplated.

By way of the illustrated examples shown in FIG. 3, if it is known that the target execution platform supports VXML, the generic directive call flow object is converted into a VXML formatted directive. If it is known that the target execution platform supports a traditional IVR call flow, the generic directive call flow object is converted into a traditional IVR formatted directive. The translation/conversion may be accomplished by means of a layered hierarchy of formatting objects or look-up tables in which the generic directive call flow objects are mapped to execution platform specific directives.

In the case of a generic meta-grammar call flow object, the speech recognition grammar translation module 136 functions to convert (3B) the generic meta-grammar call flow object into a platform specific grammar. As again illustrated in the examples set forth in FIG. 3, if it is known that the target execution platform supports a "Tellme" VXML browser, the generic meta-grammar call flow object is converted into a recognition grammar having a format recognizable by call flow interpreter or ASR resources associated with the "Tellme" VXML browser. If it is known that the target execution platform supports traditional IVR call flow, the generic meta-grammar call flow object is converted into a format recognizable by a traditional call flow interpreter or ASR resources. The translation/conversion may be accomplished by querying (1F) the meta-grammar repository 130 in which generic meta-grammar call flow objects are mapped to execution platform specific grammars using a layered hierarchy of formatting objects.

In the case of an audio abstraction translation, audio is treated as a logical abstraction and is translated (3C) at run-time, as are directives and meta-grammars, into URIs which are mapped to specific files within the application environment framework 116. This mapping is performed, in particular, by querying (1G) the audio repository 132. The audio repository 132 maintains a mapping between a generic audio abstraction call flow object and the specific file URIs which comprise the data that is representative of the platform specific audio call flow object. This data may include audio of a particular spoken language in a specific file format (i.e., *.wav, *.voc, etc.), the sampling rate, and/or the digitization granularity, remote or local location, and file naming conventions.

As further illustrated in FIG. 3, the execution platform translation services layer 126 may further function to place (3D) translated call flow objects into platform specific, mark-up language dialects. For example, when the target execution platform 112 is known to utilize a VXML interface to its local call flow interpreter, the translated call flows can be scripted into a VXML page. To the extent necessary, the execution platform translation services layer is cognizant of any specific formatting required by the browser resident on the target execution platform 112 (i.e., the tags and attributes recognizable by the browser hosted on the target execution platform). Thus, this latter conversion is used to support any vendor-specific variances to the browser since the call flow objects are first converted using any existing standards as a guideline. This latter conversion also allows conversion to take place in the case where there are omissions in an existing standard.

Spoken language for all audio and grammar is also selected independent of the call flow served to the user. To this end, audio and grammar selection is handled by the spoken language translation module 139. The initial request from the execution platform 112 will include information that allows the spoken language translation module 139 to determine the appropriate spoken language and grammar to be used for the specific interaction with the end-user.

Once a call flow object has been translated by the execution platform translation services layer 126, the translated call flow is passed (1H) to the communication server layer 122 where it is formatted (3E) into a reply message having the protocol appropriate for the target execution platform 112. The reply message is then transmitted (1I) to the target execution platform 112. This reply message is parsed by the execution platform 112, the platform specific call flow extracted, and the platform specific call flow executed in accordance with the local call flow interpreter.

If execution of the call flow by the execution platform 112 results in further end-user interaction with the IVR network 110, the process is repeated. Subsequent requests from the execution platform 112 may contain results of user interactions, such as recognized utterances, DTMF digits captured, etc., and these results can alter subsequent call flow navigation for this session. In accordance with the description set forth above, the execution platform 112 would again communicate a request to the application environment framework 116, the next call flow state in the speech application execution thread corresponding to the current end user session would be identified by the generic call flow interpreter module 128, the call flow object corresponding to this state would be translated by the execution platform translation services layer 126, a response message including the translated, platform specific call flow object would be formatted by the communications server layer 122, and a reply transmitted to the target execution platform 112 to control the further actions taken by the execution platform 112 as it interacts with the end-user. It will be appreciated that the tracking of the current end-user session can be accomplished using cookie technology, data embedded in communication messages, or the like. Furthermore, by being a multi-threaded application, it will be appreciated that the application environment framework 116 is able to handle numerous end-user sessions originating from one or more execution platforms 112. One instance of the application framework can simultaneously serve end-user sessions for a variety of speech applications, each application employing one or more spoken languages, determined at the session level, for speech recognition and audio playing.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof. All of the references cited herein are hereby incorporated by reference in their entirety.

What is claimed is:

1. A method for providing speech applications, comprising:

receiving a request message from a target execution platform having a local call flow interpreter to execute a speech application comprised of a plurality of generic call flow objects, the local call flow interpreter recognizing platform specific call flow objects formatted in one of a standardized format not specific to the local call flow interpreter or a proprietary format specific to the local call flow interpreter, the target execution platform further recognizing reply messages formatted in one of-a standardized protocol not specific to the target execution platform or a proprietary protocol specific to the target execution platform;

determining, in response to the request message, whether the local call flow interpreter recognizes platform specific call flow objects formatted in the standardized format, whether the local call flow interpreter recognizes platform specific call flow objects formatted in the proprietary format, whether the target execution platform recognizes reply messages formatted in the standardized protocol, and whether the target execution platform recognizes reply messages formatted in the proprietary protocol; and while executing the speech application in response to the request message, translating generic call flow objects into platform specific call flow objects having the standardized format when the determining has determined that the local call flow interpreter recognizes platform specific call flow objects formatted in the standardized format and translating generic call flow objects into platform specific call flow objects having the proprietary format when the determining has determined that the local call flow interpreter recognizes platform specific call flow objects formatted in the proprietary format, formatting the platform specific call flow objects into reply messages using the standardized protocol when the determining determines that the target execution platform recognizes reply messages formatted in the standardized protocol and formatting the platform specific call flow objects into reply messages using the proprietary protocol when the determining determines that the target execution platform recognizes reply messages formatted in the proprietary protocol, and transmitting the reply messages to the target execution platform whereby the speech application effectively controls the operation of the local call flow interpreter to provide voice interaction with an end user.

2. The method as recited in claim 1, wherein multiple messages are received from the target execution platform which messages influence the flow of the speech application.

3. The method as recited in claim 1, wherein the call flow objects comprise metagrammar objects.

4. The method as recited in claim 1, wherein the call flow objects comprise call flow directive objects.

5. The method as recited in claim 1, wherein the call flow objects comprise audio objects.

6. The method as recited in claim 1, wherein the step of translating the generic call flow objects into platform specific call flow objects comprises providing a VXML representation of the generic call flow objects.

7. The method as recited in claim 6, where the step of providing a VXML representation of the generic call flow objects comprises the steps of using VXML standards and any particularities of a VXML browser hosted on the target execution platform to form the platform specific call flow objects.

8. The method as recited in claim 1, wherein the step of translating the generic call flow objects into platform specific call flow objects comprises providing a SALT representation of the generic call flow objects.

9. The method as recited in claim 1, wherein the generic call flow objects are represented using XML.

10. The method as recited in claim 1, wherein the step of formatting the platform specific call flow objects into reply messages comprises using HTTP protocol.

11. The method as recited in claim 1, wherein the step of formatting the platform specific call flow objects into reply messages comprises using SSL protocol.

12. The method as recited in claim 1, wherein the step of translating the generic call flow objects into platform specific call flow objects comprises using an audio file URI.

13. The method as recited in claim 1, wherein the request message comprises data indicative of a local call flow interpreter type and wherein the local call flow interpreter type is used in the step of translating the generic call flow objects into platform specific call flow objects.

14. A computer-readable media having instructions for providing voice interactions, the instructions performing steps comprising:
   receiving a request from a target execution platform having a local call flow interpreter to execute a speech application comprised of a plurality of generic call flow objects, the local call flow interpreter recognizing platform specific call flow objects formatted in one of a standardized format not specific to the local call flow interpreter or a proprietary format specific to the local call flow interpreter, the target execution platform further recognizing reply messages formatted in one of-a standardized protocol not specific to the target execution platform or a proprietary protocol specific to the target execution platform;
   determining, in response to the request, whether the local call flow interpreter recognizes platform specific call flow objects formatted in the standardized format, whether the local call flow interpreter recognizes platform specific call flow objects formatted in the proprietary format, whether the target execution platform recognizes reply messages formatted in the standardized protocol, and whether the target execution platform recognizes reply messages formatted in the proprietary protocol; and
   while executing the speech application in response to the request, translating generic call flow objects into platform specific call flow objects having the standardized format when the determining has determined that the local call flow interpreter recognizes platform specific call flow objects formatted in the standardized format and translating generic call flow objects into platform specific call flow objects having the proprietary format when the determining has determined that the local call flow interpreter recognizes platform specific call flow objects formatted in the proprietary format, formatting the platform specific call flow objects into reply messages using the standardized protocol when the determining determines that the target execution platform recognizes reply messages formatted in the standardized protocol and formatting the platform specific call flow objects into reply messages using the proprietary protocol when the determining determines that the target execution platform recognizes reply messages formatted in the proprietary protocol, and transmitting the reply messages to the target execution platform whereby the speech application effectively controls the operation of the local call flow interpreter to provide voice interaction with an end user.

15. A system for providing voice interactions, comprising:
   a communications layer for sending and receiving messages from an execution platform having a local call flow interpreter, the local call flow interpreter recognizing platform specific call flow objects formatted in one of a standardized format not specific to the local call flow interpreter or a proprietary format specific to the local call flow interpreter, the execution platform further recognizing reply messages formatted in one of-a standardized protocol not specific to the execution platform or a proprietary protocol specific to the execution platform;
   a generic call flow interpreter module for executing a speech application comprising generic call flow objects in response to messages received from the execution platform; and
   an execution platform translation services layer for determining whether the local call flow interpreter recognizes platform specific call flow objects formatted in the standardized format, whether the local call flow interpreter recognizes platform specific call flow objects formatted in the proprietary format, whether the execution platform recognizes messages formatted in the standardized protocol, and whether the target execution platform recognizes reply messages formatted in the proprietary protocol; and translating generic call flow objects of an executing speech application into platform specific call flow objects having the standardized format when the execution platform translation services layer has determined that the local call flow interpreter of the execution platform recognizes platform specific call flow objects formatted in the standardized format and translating generic call flow objects of the executing speech application into platform specific call flow objects having the proprietary format when the execution platform translation services layer has determined that the local call flow interpreter of the execution platform recognizes platform specific call flow objects formatted in the proprietary format;
   wherein the execution platform translation services layer passes the platform specific call flow objects to the communications layer which formats the platform specific call flow objects into messages intended for the execution platform using the standardized protocol when the execution platform translation services layer determines that the target execution platform recognizes messages formatted in the standardized protocol and formats the platform specific call flow objects into messages using the proprietary protocol when the execution platform translation services layer determines that the target execution platform recognizes messages formatted in the proprietary protocol.

16. The system as recited in claim 15, further comprising a session manager cooperating with the communications layer and the generic call flow interpreter module for controlling the execution of the speech application.

17. The system as recited in claim 15, wherein the execution platform translation services layer comprises a command translation module.

18. The system as recited in claim 15, wherein the execution platform translation services layer comprises a speech recognition grammar translation module.

19. The system as recited in claim 18, wherein the speech recognition grammar translation module is associated with a meta-grammar repository which maps generic meta-grammar call objects to platform specific grammars.

20. The system as recited in claim 15, wherein the execution platform translation services layer comprises an audio file translation module.

21. The system as recited in claim 20, wherein the audio file translation module is associated with an audio repository which maps generic audio objects to audio files.

22. The system as recited in claim 15, wherein the communications layer comprises an HTTP module for receiving and transmitting messages using HTTP protocol.

23. The system as recited in claim 15, wherein the communications layer comprises an SSL module for receiving and transmitting messages using SSL protocol.

24. The system as recited in claim 15, wherein the execution platform translation services layer converts the generic call flow objects into a VXML document.

25. The system as recited in claim 15, wherein the generic call flow objects are represented using XML.

26. A system for providing voice interactions, comprising:
an execution platform having a local call flow interpreter and means for voice interaction with an end-user, the local call flow interpreter recognizing platform specific call flow objects formatted in one of a standardized format not specific to the local call flow interpreter or a proprietary format specific to the local call flow interpreter, the execution platform recognizing messages formatted in one of a standardized protocol not specific to the execution platform or a proprietary protocol specific to the execution platform; and
an application environment framework in communication with the execution platform, the application environment framework comprising a communications layer for sending and receiving messages from the execution platform; a generic call flow interpreter module for executing a speech application comprising generic call flow objects in response to messages received from the execution platform; and an execution platform translation services layer for determining whether the local call flow interpreter recognizes platform specific call flow objects formatted in the standardized format, whether the local call flow interpreter recognizes platform specific call flow objects formatted in the proprietary format, whether the execution platform recognizes reply messages formatted in the standardized protocol, and whether the execution platform recognizes reply messages formatted in the proprietary protocol and translating generic call flow objects of an executing speech application into platform specific call flow objects having the standardized format when the execution platform translation services layer has determined that the local call flow interpreter of the execution platform recognizes platform specific call flow objects formatted in the standardized format and translating generic call flow objects of the executing speech application into platform specific call flow objects having the proprietary format when the execution platform translation services layer has determined that the local call flow interpreter of the execution platform recognizes platform specific call flow objects formatted in the proprietary format a format;
wherein the execution platform translation services layer passes the platform specific call flow objects to the communications layer which formats the platform specific call flow objects into messages which are transmitted to the execution platform using the standardized protocol when the execution platform translation services layer determines that the target execution platform recognizes messages formatted in the standardized protocol and formats the platform specific call flow objects into messages using the proprietary protocol when the execution platform translation services layer determines that the target execution platform recognizes messages formatted in the proprietary protocol, such that the speech application executing on the application environment framework effectively controls the operation of the local call flow interpreter to provide voice interaction with the end user.

27. The system as recited in claim 26, wherein the execution platform comprises a general purpose computer hosting a speech application.

28. The system as recited in claim 26, wherein the execution platform comprises an IVR execution platform.

29. The system as recited in claim 28, wherein the execution platform hosts a VXML browser application.

* * * * *